United States Patent
Roma (10) Patent No.: US 9,386,861 B2
(45) Date of Patent: *Jul. 12, 2016

(54) TELESCOPING SPRING ASSEMBLY FOR MATTRESSES AND THE LIKE

(71) Applicant: Otis Bed Manufacturing Company, Inc., Buffalo, NY (US)

(72) Inventor: John K. Roma, Orchard Park, NY (US)

(73) Assignee: OTIS BED MANUFACTURING COMPANY, INC., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/203,201

(22) Filed: Mar. 10, 2014

(65) Prior Publication Data

US 2014/0191454 A1    Jul. 10, 2014

Related U.S. Application Data

(63) Continuation-in-part of application No. 13/622,648, filed on Sep. 19, 2012, now Pat. No. 8,714,531.

(60) Provisional application No. 61/536,729, filed on Sep. 20, 2011.

(51) Int. Cl.
| F16F 1/12 | (2006.01) |
| A47C 23/30 | (2006.01) |
| A47C 23/043 | (2006.01) |
| A47C 27/06 | (2006.01) |

(52) U.S. Cl.
CPC .............. *A47C 23/30* (2013.01); *A47C 23/0438* (2013.01); *A47C 27/063* (2013.01); *F16F 1/128* (2013.01); *Y10T 29/49613* (2015.01)

(58) Field of Classification Search
CPC ........... F16F 1/128; F16F 1/121; F16F 1/125; F16F 1/126; F16F 1/122; F16F 1/123; F16F 1/024; F16F 3/04; A47C 27/063; A47C 27/064; A47C 23/0507; E05D 13/1246; E05D 13/1223

See application file for complete search history.

(56) References Cited

U.S. PATENT DOCUMENTS

| 1,502,510 | A | * | 7/1924 | Marcus | A47C 27/04 5/655.8 |
| 1,841,795 | A | * | 1/1932 | Duffy | B60G 11/42 267/30 |
| 2,765,141 | A | * | 10/1956 | Applegate | F16F 3/04 267/136 |
| 3,814,357 | A | * | 6/1974 | Rontgen | F16F 1/128 248/573 |
| 4,451,946 | A | * | 6/1984 | Stumpf | A47C 27/064 5/655.8 |
| 5,090,657 | A | * | 2/1992 | Dreiman | F16F 15/067 248/624 |
| 7,640,611 | B1 | * | 1/2010 | Kluft | A47C 23/30 5/716 |
| 8,714,531 | B2 | * | 5/2014 | Roma | A47C 23/0438 267/220 |
| 2014/0312544 | A1 | * | 10/2014 | Shah | F16F 1/128 267/170 |

* cited by examiner

*Primary Examiner* — Anna Momper
*Assistant Examiner* — Stephen Bowes
(74) *Attorney, Agent, or Firm* — Hodgson Russ LLP (57) ABSTRACT

A spring assembly includes telescopically adjustable inner and outer members biased in an extension direction by a coil spring. A preload member is provided to apply a compression preload to the coil spring. The preload member can eliminate stickiness and the popping sound that are drawbacks of the prior art, and the fabric sleeve also provides general noise reduction when the spring assembly changes length.

14 Claims, 9 Drawing Sheets

TELESCOPING SPRING ASSEMBLY FOR MATTRESSES AND THE LIKE

CROSS REFERENCE TO RELATED APPLICATIONS

This application claims benefit as a continuation-in-part of U.S. patent application Ser. No. 13/622,648 filed Sep. 19, 2012, which application is incorporated by reference herein.

FIELD OF THE INVENTION

The present disclosure relates generally to mattresses and cushioning devices for home and/or hospital use, and more particularly to a telescoping spring assembly usable as a component of a mattress or cushioning device.

BACKGROUND OF THE INVENTION

U.S. Pat. No. 6,996,865 to Sabin describes a mattress structure in which a support assembly comprises a support plate having an array of mounting holes each receiving a respective telescoping spring assembly. In U.S. Pat. No. 6,996,865, various embodiments of the spring assembly are identified by the reference numerals 20, 120, 220, 320, and 420. The various spring assembly embodiments are telescoping spring assemblies in the sense that each has an inner member arranged to be axially slidable within an outer tubular member, and a mechanical spring is arranged within the inner and outer members to bias the members in an extension direction. The Sabin patent teaches that it is desirable to preload the spring to control firmness. In order to achieve preload, Sabin discloses the use of a spacer (e.g., spacers 28, 128, and 228) engaging an end of the spring and one of the tubular members, wherein the spacer has an axial length chosen to provide a desired preload. The spring assemblies mounted on the support plate may have different preload characteristics achieved by using spacers of different lengths to vary the firmness of the mattress in different support zones.

Efforts to commercialize the invention in U.S. Pat. No. 6,996,865 have been met with certain design challenges. A significant challenge has been the fact that the preload applied to the coil spring is transmitted to the inner and outer tubular members. Under this design, the inner and outer members are forced into a fully extended condition (absent external loading) and are prevented from separating by engagement of opposing shoulder surfaces on the external wall surface of the inner member and on the internal wall surface of the outer member. As a result, the frictional engagement between the shoulders of the inner and outer members causes the spring assembly to be "sticky" at times, and the spring assembly does not always react as intended when an external load is first applied. Moreover, after an external load is removed from a compressed spring assembly, the biasing force of the coil spring immediately pushes the outer member in the extension direction, and the ensuing engagement of opposing shoulder surfaces on the inner and outer members generates a popping sound that is disruptive to a person at rest.

SUMMARY OF THE INVENTION

The present invention solves both of these challenges, and does so by eliminating the need for a spacer of special length in each spring assembly.

The present invention is embodied by a spring assembly comprising a tubular outer member including a support end and an open receiving end opposite the support end, and a tubular inner member including an insertion end and a mounting end opposite the insertion end, wherein the insertion end of the inner member is received through the open receiving end of the outer member such that the outer member is telescopically movable relative to the inner member in a compression direction and an extension direction opposite from the compression direction. The spring assembly further comprises a coil spring arranged to bias the outer member in the extension direction relative to the inner member. In accordance with the present invention, the spring assembly comprises a fabric sleeve fitted about an inner diameter and an outer diameter of the coil spring, wherein the fabric sleeve is closed at its opposite ends to apply a compression preload to the coil spring. The fabric sleeve prevents transmission of the preload to the tubular members to eliminate the problems of stickiness and noise when the spring assembly changes length.

The present invention may also be embodied as a spring assembly including a tubular outer member including a support end and an open receiving end opposite the support end. The assembly may also include an inner member, including an insertion end and a mounting end opposite the insertion end. The insertion end can be received by the outer member through the open receiving end of the outer member, the outer member being telescopically movable relative to the inner member in a compression direction and an extension direction opposite from the compression direction. A coil spring can be arranged to bias the outer member in the extension direction relative to the inner member. A first bumper insert may be arranged at a first end of the coil spring, and a second bumper insert may be arranged at a second end of the coil spring. A preload member can extend from the first bumper insert to the second bumper insert. The preload member may be configured to apply a compression preload to the coil spring.

In another embodiment, the present invention is embodied as a method of making a spring assembly. A tubular outer member including a support end and an open receiving end opposite the support end can be provided. An inner member including an insertion end and a mounting end opposite the insertion end can be provided. A coil spring may be arranged to bias the outer member in the extension direction relative to the inner member. A first bumper insert may be arranged at a first end of the coil spring. A second bumper insert may be arranged at a second end of the coil spring. A preload member can be arranged to extend from the first bumper insert to the second bumper insert. The preload member can be configured to apply a compression preload to the coil spring.

BRIEF DESCRIPTION OF THE DRAWING VIEWS

Features and advantages of embodiment(s) of the present disclosure will become apparent by reference to the following detailed description and drawings, in which.

DETAILED DESCRIPTION OF THE INVENTION

Figure 1:
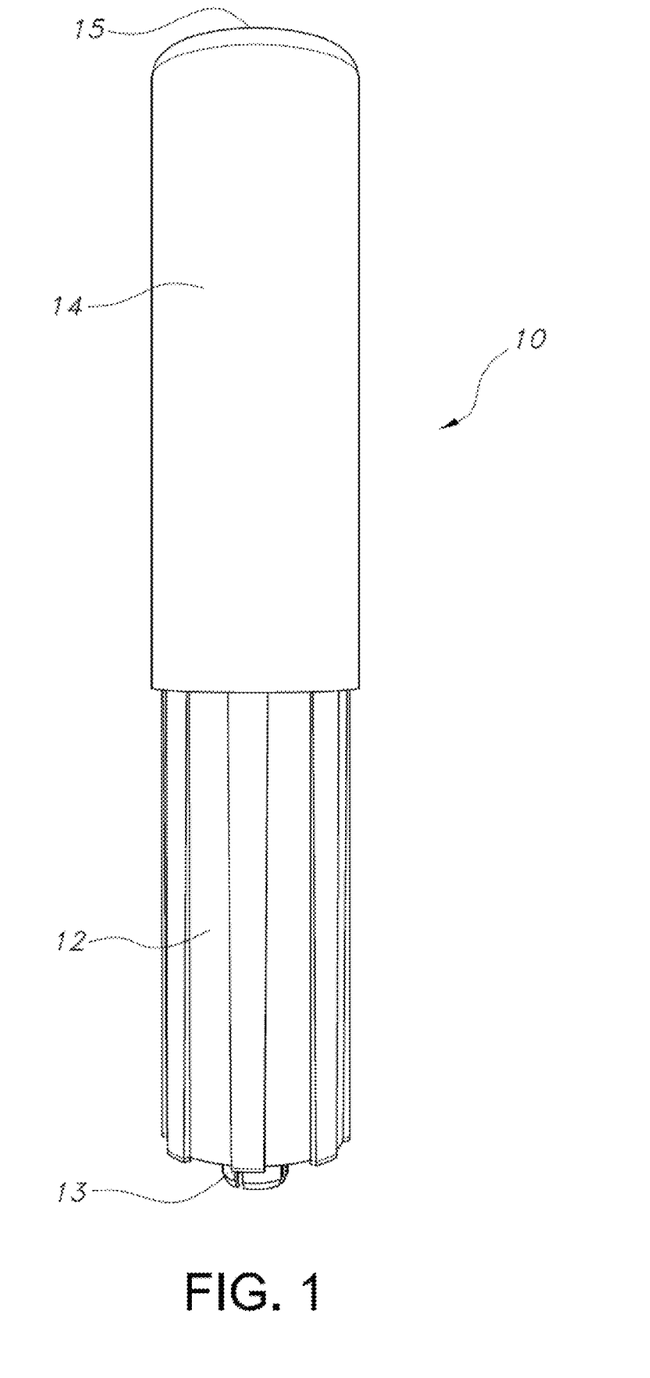
FIG. 1 is a perspective view of a telescoping spring assembly formed in accordance with an embodiment of the present invention.

A telescoping spring assembly formed in accordance with the present invention is shown in FIG. 1 and identified generally by reference numeral 10. Spring assembly 10 comprises a tubular inner member including an insertion end and a mounting end opposite the insertion end. The mounting end is characterized by a fitting 13 for insertion into a corresponding mounting hole of a plate (not shown), whereby an array of closely spaced spring assemblies 10 may be formed to provide the core of a mattress as taught by the aforementioned U.S. Pat. No. 6,996,865, the entire disclosure of which is incorporated herein by reference. Spring assembly 10 also comprises a tubular outer member 14 including a support end 15 and an open receiving end opposite the support end. As may be seen in FIG. 1, the insertion end of inner member 12 is received by outer member 14 through the open receiving end of the outer member. As may be understood, outer member 14 is telescopically movable relative to inner member 12 in a compression direction to shorten the overall length of spring assembly 10, and in an extension direction opposite from the compression direction to extend the overall length of the spring assembly.

Figure 2:
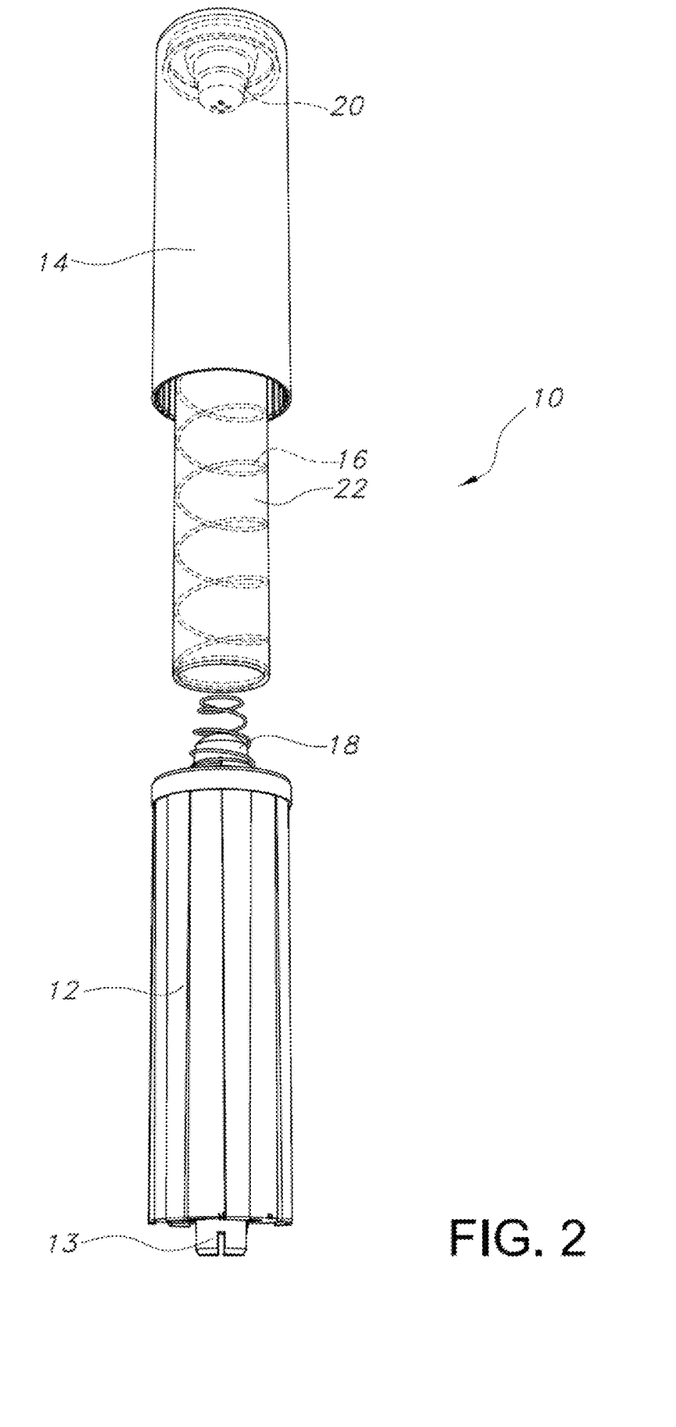
FIG. 2 is an exploded view of the telescoping spring assembly shown in FIG. 1.

Reference is made now to FIG. 2. Spring assembly 10 further comprises a coil spring 16 arranged to bias outer member 14 in the extension direction relative to inner member 12. In the embodiment shown, one end of coil spring 16 bears against a bumper insert 18 disposed at the insertion end of inner member 12, and an opposite end of coil spring 16 bears against another bumper insert 20 disposed in outer member 14 axially adjacent to support end 15.

Figure 3:
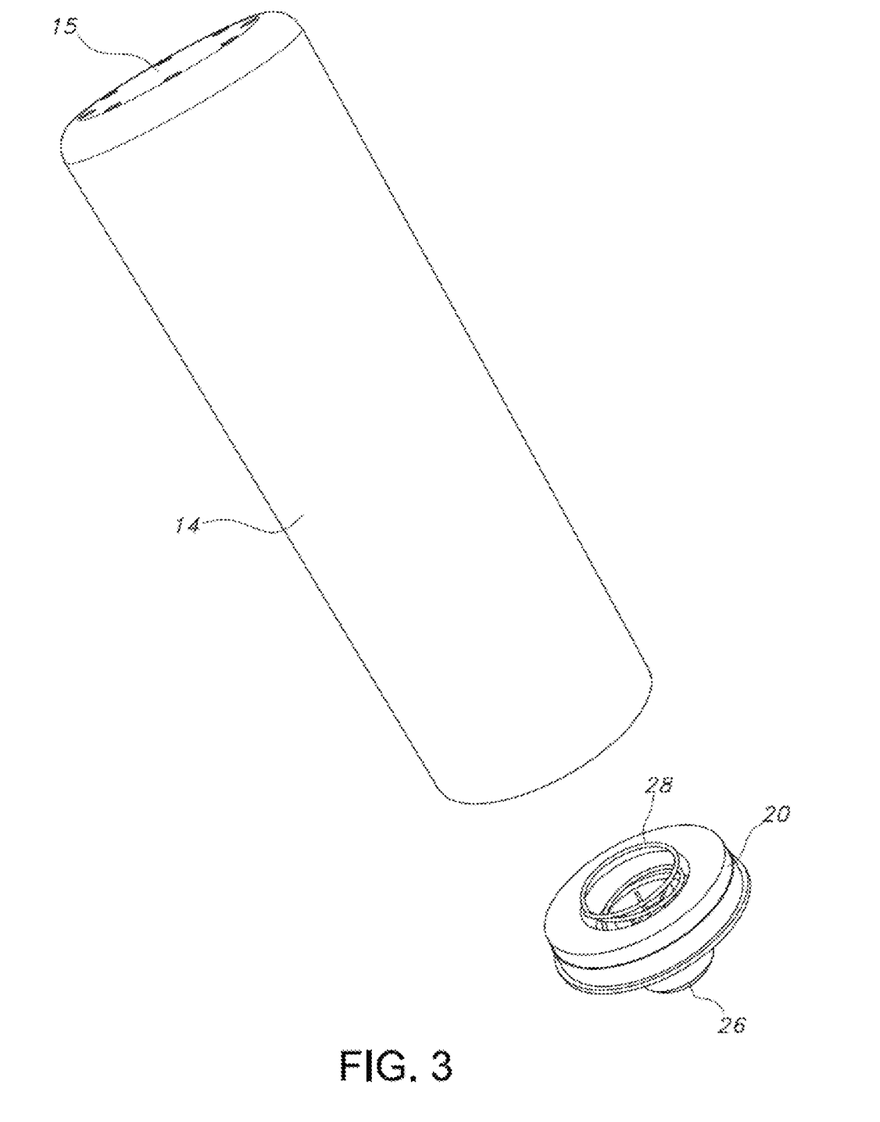
FIG. 3 is an exploded view of a support cap subassembly of the spring assembly shown in FIG. 1.
Figure 4:
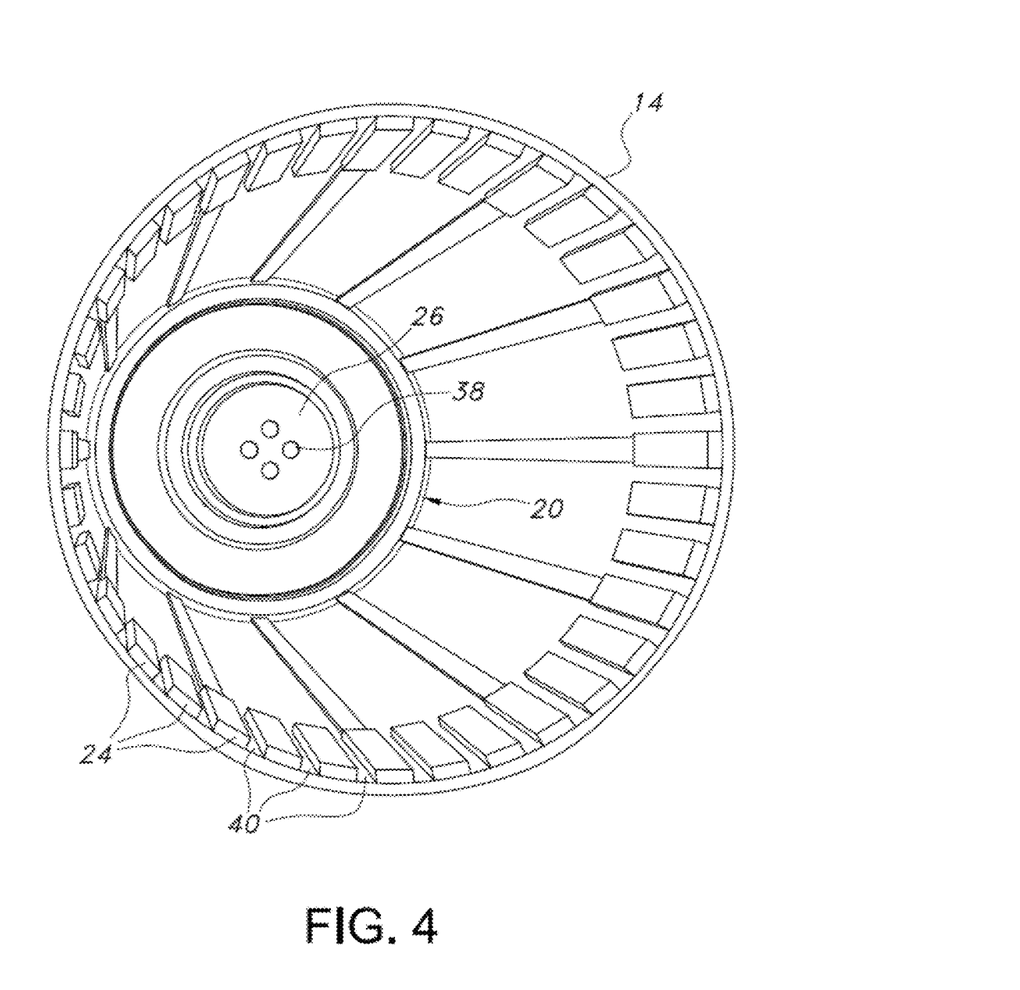
FIG. 4 is an end view of the support cap subassembly shown in FIG. 3.
Figure 5:
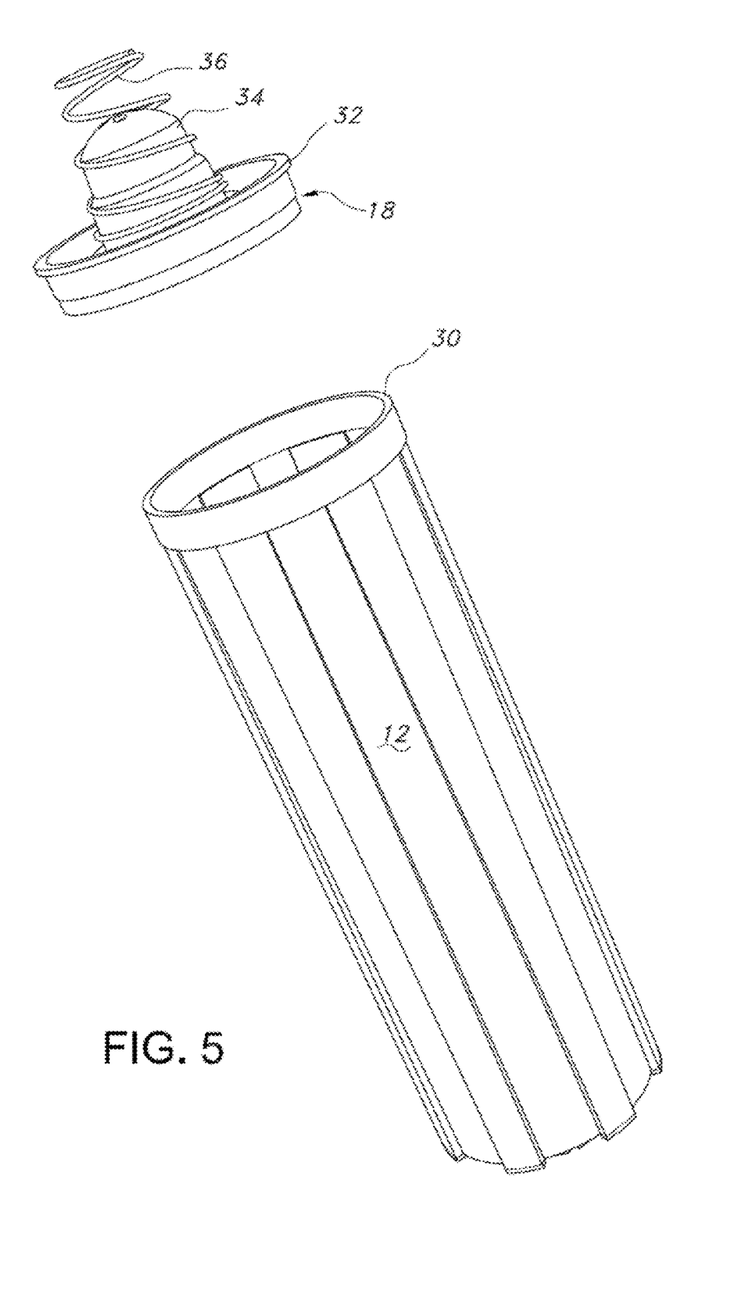
FIG. 5 is an exploded view of a mounting subassembly of the spring assembly shown in FIG. 1.
Figure 6:
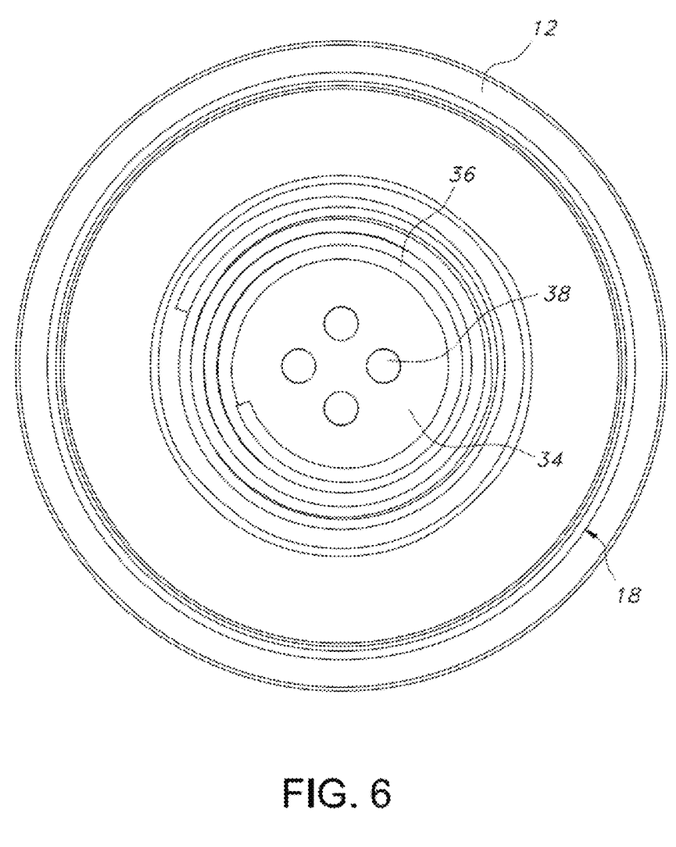
FIG. 6 is an end view of the mounting subassembly shown in FIG. 5.

FIGS. 3 and 4 show outer member 14 and bumper insert 20 in further detail. As may be seen, outer member 14 includes a plurality axially extending ribs 24 spaced at regular angular intervals about an internal wall of the outer member adjacent the open receiving end of the outer member. In the embodiment shown, bumper insert 20 includes a generally rigid plastic insert on which an elastically deformable bumper piece 26 is mounted to face inner member 12, and a bumper spring 28 is disposed on the opposite side of bumper insert 20 to engage support end 15 of outer member 14. Bumper spring 28 may be chosen to have greater stiffness than coil spring 16. FIGS. 5 and 6 show inner member 12 and bumper insert 18 in further detail. Inner member 12 includes a circumferential shoulder 30 around an external wall of the inner member adjacent the insertion end of the inner member. In the embodiment shown, bumper insert 18 includes a generally rigid plastic having a lip 32 sized to engage the insertion end of inner member 12 such that bumper insert 18 remains located at the insertion end of inner member 12. An elastically deformable bumper piece 34 is mounted on bumper insert 18 to face bumper insert 20. A bumper spring 36 is disposed on the same side of bumper insert 18 so that it also faces bumper insert 20. Bumper spring 36 may be chosen to have greater stiffness than coil spring 16. The bumper inserts 18 and 20, and the bumper springs 36 and 28, provide stiffer cushioning as spring assembly 10 approaches a fully compressed condition to prevent "bottoming out" under very heavy external loads.

Airflow into and out of spring assembly 10 during telescoping volume changes is allowed by passages through the mounting end of inner member 12 and the support end of outer member 14, however these passages are not visible in the drawing views. Such airflow is also allowed by passages 38 through bumper inserts 18 and 20, and by gaps 40 between ribs 24 in outer member 14.

Axial separation of outer member 14 and inner member 12 may be prevented unless an intentionally large separation force is applied. In the embodiment shown, axial separation is prevented by engagement of circumferential shoulder 30 with the ends of ribs 24 closest to support end 15. However, as will be understood from the description below, when coil spring 16 is properly preloaded, outer member 14 freely floats on the coil spring such that the ends of ribs 24 are slightly spaced from engagement with shoulder 30 to avoid the sticking problem mentioned in the background section.

Figure 7:
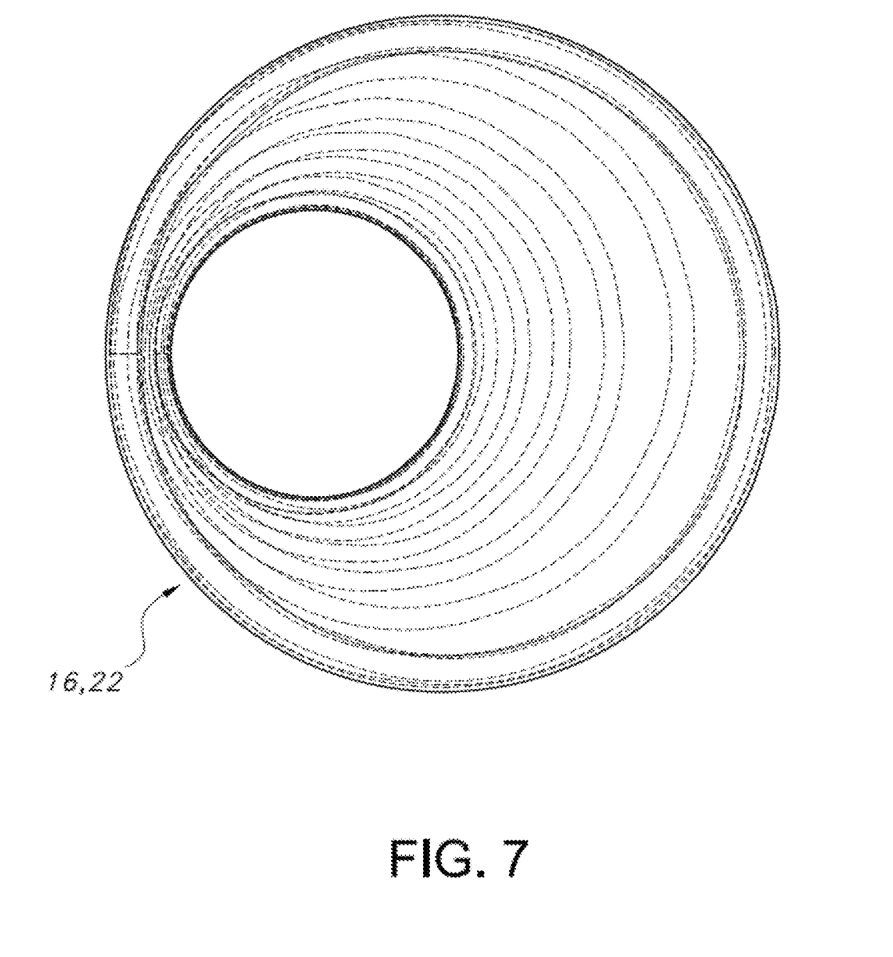
FIG. 7 is an end view of a coil spring of the telescoping spring assembly, wherein the coil spring is enclosed in a fabric sleeve.

In accordance with the present invention, spring assembly 10 additionally comprises a fabric sleeve 22 fitted about an inner diameter and an outer diameter of coil spring 16, wherein fabric sleeve 22 is closed at its opposite ends to apply a compression preload to coil spring 16. The compression preload applied to spring 16 decreases the length of the spring enough so that the ends of ribs 24 on outer member 14 do not engage shoulder 30 on inner member 12. For example, the compression preload may be chosen to provide a distance of about one-eighth of an inch between the ends of ribs 24 and shoulder 30 when spring assembly 10 is at rest and free of external loading.

Fabric sleeve 22 may be formed about coil spring 16 in a variety of ways. In one way, the sleeve begins as two separate generally rectangular sheets of non-stretch fabric, one to fit about the outer diameter of coil spring 16 and the other to fit about the inner diameter of coil spring 16. If coil spring 16 is a variable stiffness coil spring wherein the inner and outer diameters vary along the axial length of the spring, then the outer sheet must fit around the largest outer diameter and the inner sheet must fit within the smallest inner diameter. Each sheet is folded over onto itself and a lengthwise seam is formed along overlapping portions of the sheet to provide a generally tubular sleeve portion of appropriate diameter depending upon whether the sleeve portion is internal or external. The external and internal sleeve portions are then arranged around the outer diameter and inner diameter of coil spring 16, respectively a first circumferential seam may then be made near one end of coil spring 16 to secure the external sleeve portion to the internal sleeve portion. A preload is applied to coil spring 16 by compressing the coil spring to a predetermined axial length, and then a second circumferential seam is made near the second end of the compressed coil spring to secure the external sleeve portion to the internal sleeve portion, thereby confining the coil spring in a preloaded condition.

In another way of fitting fabric sleeve 22 to coil spring 16, the fabric sleeve begins as a single generally rectangular sheet of non-stretch fabric in excess of two times the intended length of preloaded coil spring 16. The single sheet is folded over onto itself and a lengthwise seam is formed along overlapping portions of the sheet to provide an elongated tubular sleeve portion of appropriate diameter to fit about the outer diameter of coil spring 16. The coil spring is inserted into the elongated tubular sleeve portion and the sleeve is inverted (turned inside-out) and fed through the interior of the coil spring. As a result, one end of the spring will be confined against the folded sleeve, and the other end of the spring will be near an open end where the two unconnected ends of the fabric sleeve are aligned with one another. A preload is applied to coil spring 16 by compressing the coil spring to a predetermined axial length, and then a circumferential seam is made to attach the aligned ends of the fabric sleeve to one another, thereby closing the open end to confine the coil spring in a preloaded condition.

Those skilled in the art will understand that seams may be formed by sewing or by ultrasonic welding, and that the amount of excess fabric material needed to form sleeve 22 may depend on the seam technology used.

At least two fabrics have been found particularly suitable for use in forming fabric sleeve 22. The first is Sparmont 900 needle punched fabric, which is recommended for coil springs with spring rates of two pounds per inch or less. The second is SW400 sonic welded fabric, which is recommended for coil springs with spring rates from two to four pounds per inch. Both fabrics are supplied by NuTex Concepts located at 2424 Norwood Street, Lenoir, N.C. 28645. Of course, other fabrics may be used.

As will be understood, the use of fabric sleeve 22 in accordance with the present invention provides important benefits. Fabric sleeve 22 maintains the preload on coil spring 16 so that engagement between inner member 12 and outer member 14 is not necessary for this task. In this way, the problem of "stickiness" is solved, and the popping sound when the spring assembly returns to its extended position is eliminated. Moreover, preload can be determined by selecting a coil spring 16 having a spring rate and free length such that the coil spring provides a desired preload when compressed by fabric sleeve 22 to a predetermined, known length. The spring rate of coil spring 16 may be a variable spring rate to provide lesser firmness during initial compression of spring assembly 10 under external loading, followed by somewhat greater firmness as the spring assembly compresses further. The performance of each spring assembly can be individualized without the need for spacers of different lengths as taught by the prior art. Also, the fabric sleeve helps to dampen and absorb acoustic energy to provide quieter spring assembly performance apart from elimination of the popping sound mentioned above.

Figure 8:
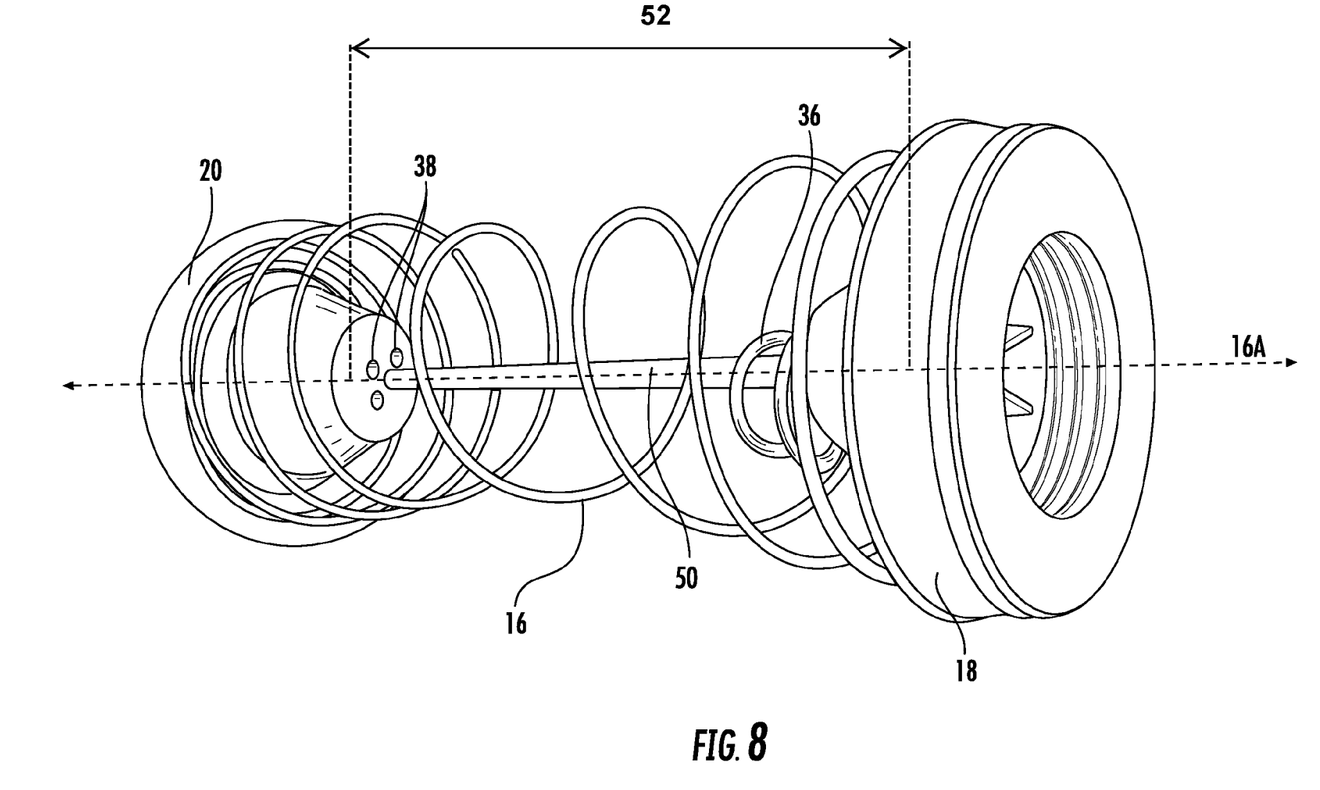
FIG. 8 is a perspective view of a preload member.
Figure 9:
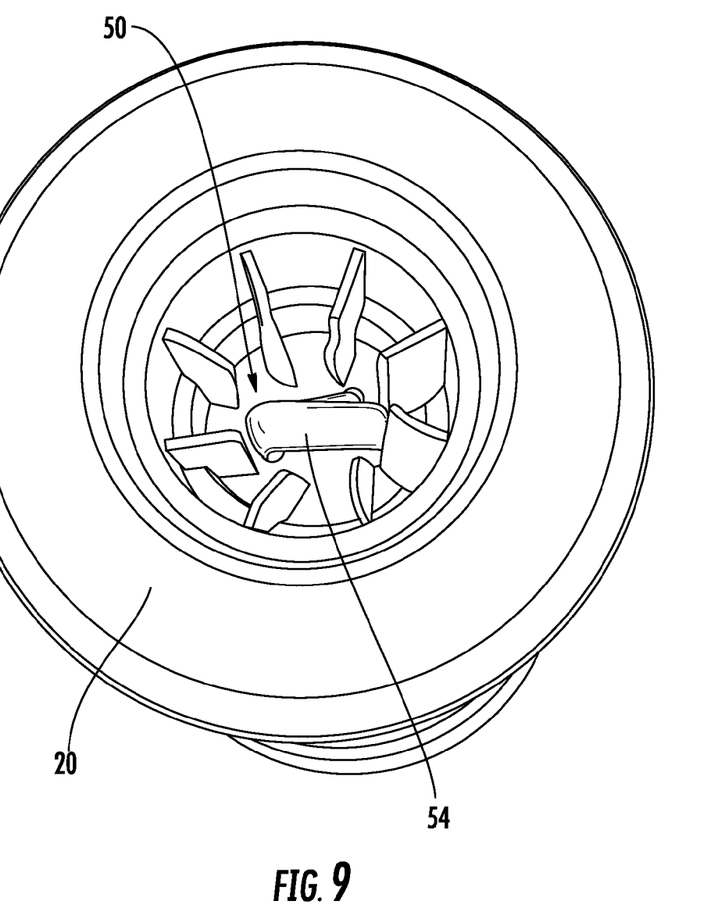
FIG. 9 is an end view of the preload member of FIG. 8.

As generally described above, the fabric sleeve 22 can serve as a "preload member" to apply a compression preload to coil spring 16. However, a compression preload may be applied with other types of "preload members" that do not include a fabric sleeve fitted about the coil spring 16. For example, FIGS. 8 and 9 show another example of a preload member 50. FIG. 8 is a perspective view of a preload member. FIG. 9 is an end view of the preload member of FIG. 8.

The preload member 50 may extend from bumper insert 18 to bumper insert 20, and include a length 52 and ends 54. The length may be made of a flexible material, such as a woven nylon or fabric material. The ends 54 can be made of a more rigid material, such as plastic. It is contemplated, however, that the preload member 50 can be made uniformly of a single material.

The preload member 50 may be located inside the diameter of coil spring 16, for example, along approximately a center axis 16A of the coil spring 16. It is possible, for example, that the preload member 50 only extend along approximately center axis 16A of the coil spring. In other words, it is possible that the preload member 50 is embodied as a single strand of material that extends between the bumper inserts 18, 20. In one embodiment, the preload member 50 extends through the airflow passages 38 of the bumper inserts 18, 20. The ends 54 may be protruded relative to the length 52 of the preload member 50 so as to prevent the ends 54 from sliding through the airflow passages 38.

The preload member 50 can be shorter (e.g. have a length) that is less than the length of the coil spring because the preload member 50 may rest within a portion of the bumper insets 18, 20 that extend into the coil spring 16. Although the ends 54 are depicted as being located at an outer, opposite side of the bumper inserts 18, 20 relative to the length 52 of the preload member 50. However, it is contemplated that the preload member 50 may be glued or otherwise affixed to an inner side of the bumper inserts 18, 20.

Unlike the fabric sleeve 22, which can provide a compression preload by itself, preload member 50 cooperates with bumper inserts 18, 20 to apply a compression preload to the coil spring 16. Furthermore, it is possible that the preload member 50 not touch the coil spring 16 in a rest state. However, in both instances (i.e. in using a preload member 50 or a fabric sleeve 22), the member applying the preload can generally extend between bumper insert 18 and bumper insert 20. The preload member 50 may also have efficiencies over the fabric sleeve 22 such as being easier to produce, faster to install in a spring assembly 10, and use less material.

While the invention has been described in connection with exemplary embodiments, the detailed description is not intended to limit the scope of the invention to the particular forms set forth. The invention is intended to cover such alternatives, modifications and equivalents of the described embodiment as may be included within the spirit and scope of the invention.

LIST OF REFERENCE SIGNS

10 Spring assembly
12 Inner member
13 Mount fitting on inner member
14 Outer member
15 Support end of outer member
16 Coil spring
16A Center axis of coil spring
18 Bumper insert of inner member
20 Bumper insert of outer member
22 Fabric sleeve
24 Ribs along internal wall of outer member
26 Bumper piece on bumper insert of outer member
28 Bumper spring on bumper insert of outer member
30 Circumferential shoulder of inner member
32 Lip on bumper insert of inner member
34 Bumper piece on bumper insert of inner member
36 Bumper spring on bumper insert of inner member
38 Airflow passages
40 Gaps between ribs
50 Second embodiment of a preload member
52 Length of second embodiment of a preload member
54 Ends of second embodiment of a preload member

What is claimed is:

1. A spring assembly, comprising:
a tubular outer member including a support end and an open receiving end opposite the support end;
an inner member including an insertion end and a mounting end opposite the insertion end, wherein the insertion end is received by the outer member through the open receiving end of the outer member, the outer member being telescopically movable relative to the inner member in a compression direction and an extension direction opposite from the compression direction;
a coil spring arranged to bias the outer member in the extension direction relative to the inner member; and
a first bumper insert arranged at a first end of the coil spring;

a second bumper insert arranged at a second end of the coil spring;

a preload member extending from the first bumper insert to the second bumper insert, the preload member configured to apply a compression preload to the coil spring;

wherein the first bumper insert includes a rigid housing on which an elastically deformable bumper piece is mounted and a bumper spring, wherein the coil spring has a first end bearing against the first bumper insert, the elastically deformable bumper piece being arranged to face toward the inner member and the bumper spring facing away from the inner member.

2. The spring assembly of claim 1, wherein the preload member is a fabric sleeve fitted about an inner diameter and an outer diameter of the coil spring.

3. The spring assembly of claim 1, wherein the preload member is located inside the diameter of the coil spring.

4. The spring assembly of claim 3, wherein the preload member extends along approximately a center axis of the coil spring.

5. The spring assembly of claim 1, wherein the coil spring has a length in an uncompressed state, the preload member having a length that is less than the length of the coil spring in the uncompressed state.

6. The spring assembly of claim 1, wherein the first bumper insert and the second bumper insert each include an airflow passage;

wherein the preload member extends through the airflow passages of the first bumper insert and the second bumper insert.

7. The spring assembly of claim 1, wherein the preload member has a length extending between the first bumper insert and the second bumper insert, the length being made of a flexible material.

8. The spring assembly of claim 7, wherein the preload member extends only along approximately a center axis of the coil spring.

9. The spring assembly of claim 1, wherein the preload member has protruded ends that extend past an end of the first bumper insert and an end of the second bumper insert.

10. The spring assembly of claim 1, wherein second bumper insert includes a rigid lip, an elastically deformable bumper piece, and a bumper spring, wherein the coil spring has a second end bearing against the second bumper insert, the elastically deformable bumper piece and the bumper spring of the second insert being arranged to face the first bumper insert.

11. The spring assembly of claim 1, wherein the outer member has an exterior wall and an interior wall, the interior wall including a plurality of axially extending ribs; and wherein the plurality of axially extending ribs are spaced at regular angular intervals about the interior wall of the outer member, adjacent the open receiving end of the outer member.

12. The spring assembly of claim 11, wherein the inner member includes an external wall and a circumferential shoulder around the external wall; and wherein the compression preload of the coil spring is such that the axially extending ribs are spaced from engagement with the circumferential shoulder.

13. The spring assembly of claim 12, wherein the preload member is configured to provide a distance of about one-eighth of an inch between ends of the axially extending ribs and the circumferential shoulder when the spring assembly is at rest and free of external loading.

14. A spring assembly, comprising:

a tubular outer member including a support end and an open receiving end opposite the support end;

an inner member including an insertion end and a mounting end opposite the insertion end, wherein the insertion end is received by the outer member through the open receiving end of the outer member, the outer member being telescopically movable relative to the inner member in a compression direction and an extension direction opposite from the compression direction;

a coil spring arranged to bias the outer member in the extension direction relative to the inner member; and a first bumper insert arranged at a first end of the coil spring;

a second bumper insert arranged at a second end of the coil spring;

a preload member having a length extending from the first bumper insert to the second bumper insert and having protruded ends that extend past an end of the first bumper insert and an end of the second bumper insert;

wherein the preload member, the first bumper insert, and the second bumper insert apply a compression preload to the coil spring;

wherein the length of the preload member extends along approximately a center axis of the coil spring, the length of the preload member being flexible;

wherein the outer member has an exterior wall and an interior wall, the interior wall including a plurality of axially extending ribs; and wherein the plurality of axially extending ribs are spaced at regular angular intervals about the interior wall of the outer member, adjacent the open receiving end of the outer member.

* * * * *